United States Patent [19]
Huang

[11] Patent Number: 5,513,864
[45] Date of Patent: May 7, 1996

[54] STROLLER WITH SWITCHABLE HANDLE

[76] Inventor: Li-Chu C. Huang, No. 9, Alley 2, Lane 606, Sec. 2, Po Ai Rd,, Chia Yi City, Taiwan

[21] Appl. No.: 332,879

[22] Filed: Nov. 1, 1994

[51] Int. Cl.⁶ .................................................. B62B 7/04
[52] U.S. Cl. ........................... 280/47.36; 280/47.38; 280/47.371
[58] Field of Search ........................... 280/642, 647, 280/650, 658, 47.38, 47.36, 47.371

[56] References Cited

U.S. PATENT DOCUMENTS

| | | | |
|---|---|---|---|
| 3,689,099 | 9/1972 | Patterson | 280/642 |
| 4,191,397 | 3/1980 | Kassai | 280/647 |
| 4,591,176 | 5/1986 | Kassai | 280/650 |
| 4,632,421 | 12/1986 | Shamie | 280/642 |
| 4,660,850 | 4/1987 | Nakao et al. | 280/47.36 |
| 4,779,879 | 10/1988 | Kassai | 280/47.36 |
| 5,056,805 | 10/1991 | Wang | 280/47.36 |
| 5,062,179 | 11/1991 | Huang | 280/47.371 |
| 5,205,579 | 4/1993 | Kato et al. | 280/642 |
| 5,257,799 | 11/1993 | Cone et al. | 280/47.371 |
| 5,362,089 | 11/1994 | Jyan-Tsai | 280/47.371 |

*Primary Examiner*—Margaret A. Focarino
*Assistant Examiner*—Min Yu
*Attorney, Agent, or Firm*—Hedman, Gibson & Costigan

[57] ABSTRACT

A stroller comprising a respective folding device connected between one of a pair of front legs and a corresponding one of a pair of rear legs. A fastener is provided for pivotally coupling a substantially U-shaped handle to the folding device. A latch assembly is slidably mounted on a respective arm of the handle. The latch assembly is spring-biased to be releasably immobilized with respect to the folding device. The latch assembly is manipulatable to permit the handle and the latch assembly in together to pivot between a forward position and a rearward position.

7 Claims, 6 Drawing Sheets

STROLLER WITH SWITCHABLE HANDLE

BACKGROUND OF THE INVENTION

The present invention relates to a stroller, and more particularly, to a compact stroller that can be easily folded.

Strollers of a large size and complicated design are known to have a handle that can be switched or changed as to its orientation to be in either a forward position or a rearward position. For these robust and large size strollers, the handles are often very large to meet practical needs and the components of the stroller as a whole are not collapsible or foldable. During changing orientation of such handles, a pivotal movement of the handle about an end portion thereof is performed. The pivotal movement about the end portion, instead of other portions near an intermediate of the handle, insures that a maximum horizontal distance is traveled by hand grip of the handle, which is desired for a large size stroller. A locking mechanism is provided on an upper portion of the handle, spaced a distance from the end portion, to releasably anchor the handle in the forward or rearward position.

A compact stroller, in contrast to the above mentioned large size strollers, is simple in structure and usually can be collapsed or folded. Such type of strollers can be seen in Applicant's U.S. Pat. No. 5,460,398, entitled "Foldable Stroller", filed on Sep. 28, 1994, and U.S. Pat. No. 5,427,402, dated Jun. 27, 1995. It is noted that these two patent applications disclose a respective foldable stroller having novel folding device. However, these simple strollers are not equipped with a mechanism permitting a change or switch of position of the handle. With this in mind, the present invention aims at providing a foldable stroller in which the handle can be shifted between a forward position and a rearward position so as to change the advancing direction of the stroller as desired.

SUMMARY OF THE INVENTION

The present invention provides an improved foldable stroller of the type having a pair of front and rear legs, a respective folding device interconnected between one of the front legs and a corresponding one of the rear legs, and a substantially U-shaped handle having a pair of arms, the improvement comprising a latch assembly coupled to a respective arm of the U-shaped handle which can be manipulated to move along the arm, thereby permitting the latch assembly and the handle together to be operably pivotable between a forward position and a rearward position with respect to the folding device.

The invention also provides a stroller comprising: a pair of front legs and a pair of rear legs, a substantially U-shaped handle having a pair of arms, a respective folding device coupling one of the front legs and a corresponding one of the rear legs, means for pivotally coupled the handle to said folding device, a latch assembly slidably mounted on a respective arm of the handle, and means for biasing said latch assembly to be releasably immobilized with respect to the folding device, said latch assembly being manipulatable to permit the handle and said assembly together to pivot between a forward position and a rearward position.

These and various other advantages and features of novelty which characterize the stroller are pointed out with particularity in the claims annexed hereto and forming a part hereof. However, for a better understanding of the invention, its advantages, and the objects obtained by its use, reference should be made to the drawings which form a part hereof, and to the accompanying descriptive matter, in which there is illustrated and described a preferred embodiment of the invention.

DESCRIPTION OF THE PREFERRED EMBODIMENTS

Figure 1:
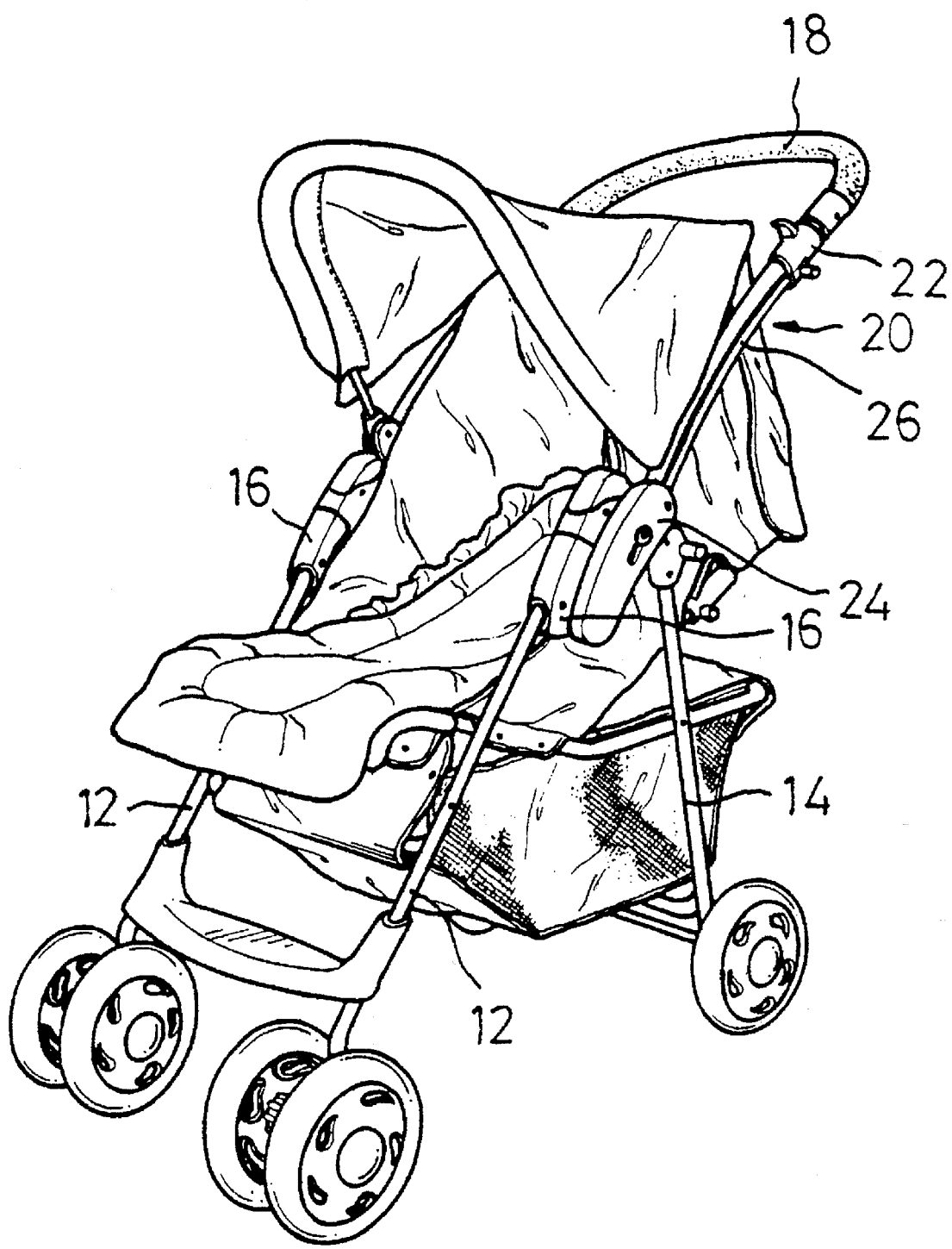
FIG. 1 is a perspective view of a stroller in accordance with the present invention.
Figure 2:
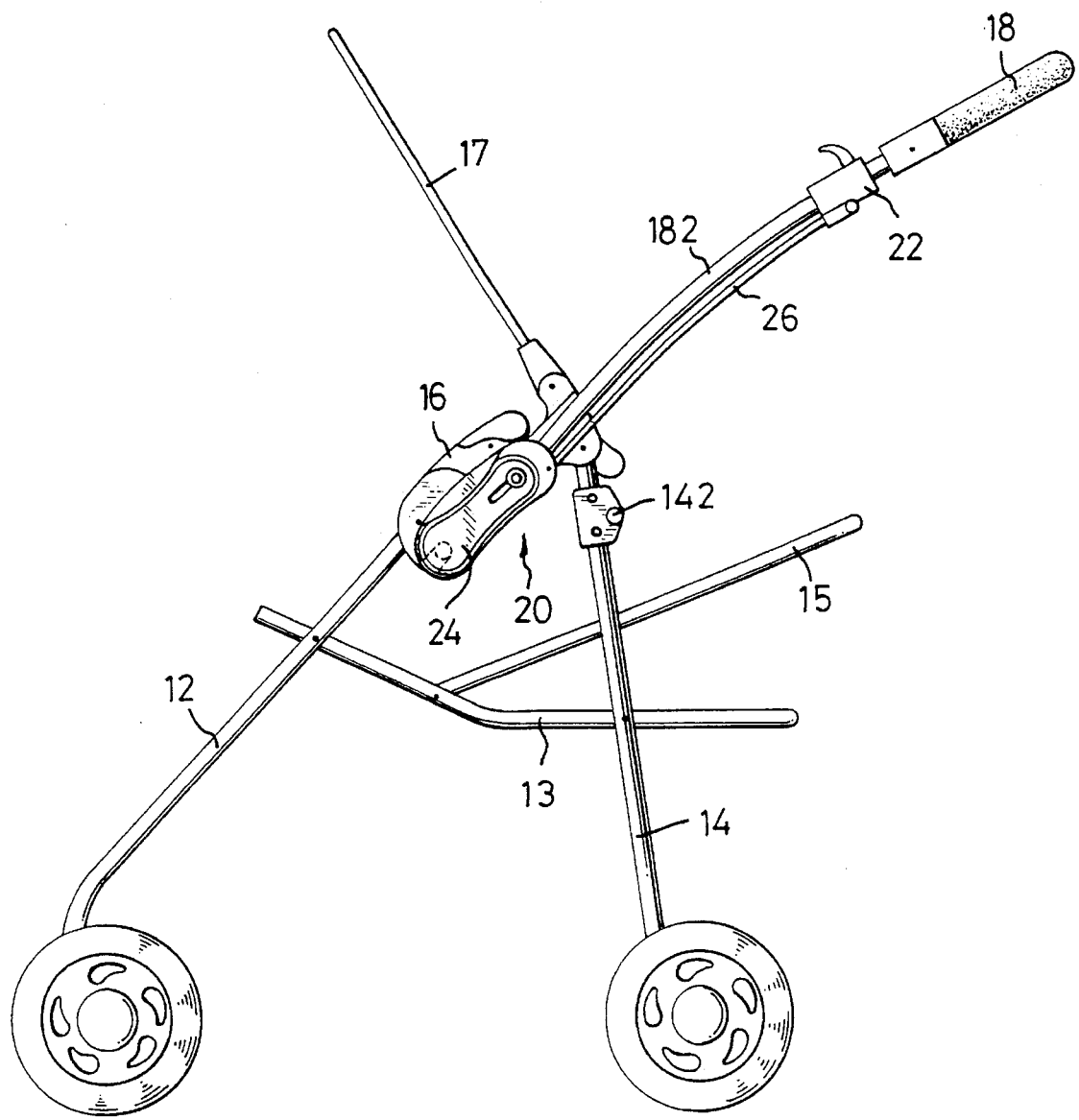
FIG. 2 is a side view of the stroller of FIG. 1 with certain components removed for simplicity and clarity.

Referring to the drawings, and particularly to FIGS. 1 and 2, a stroller in a perspective view and in a schematic simplified side view, respectively, is shown according to a preferred embodiment. The stroller generally comprises a pair of front legs 12 to which a respective front wheel is mounted, a pair of rear legs 14 to which a respective rear wheel is mounted, a respective folding device 16 interconnected between one of the front legs 12 and a corresponding one of the rear legs 14, and a substantially U-shaped handle 18 having a pair of arms 182. A seat frame member 13 pivotally connected between the front and rear logs 12 and 14, a backrest frame member 15 and a canopy supporting member 17 are also disposed. The construction described thus far is basically found in prior art strollers, except for the folding device which is disclosed in Applicant's above-mentioned two co-pending applications entitled "Foldable Stroller" and thus is incorporated herein for reference. However, instead of being foldable, the folding device can be formed of a one piece member which cannot be folded, if desired. The improvement of the invention generally lies in the provision of a latch assembly and associated designs which will facilitate the shift of position for the handle 18.

Figure 3:
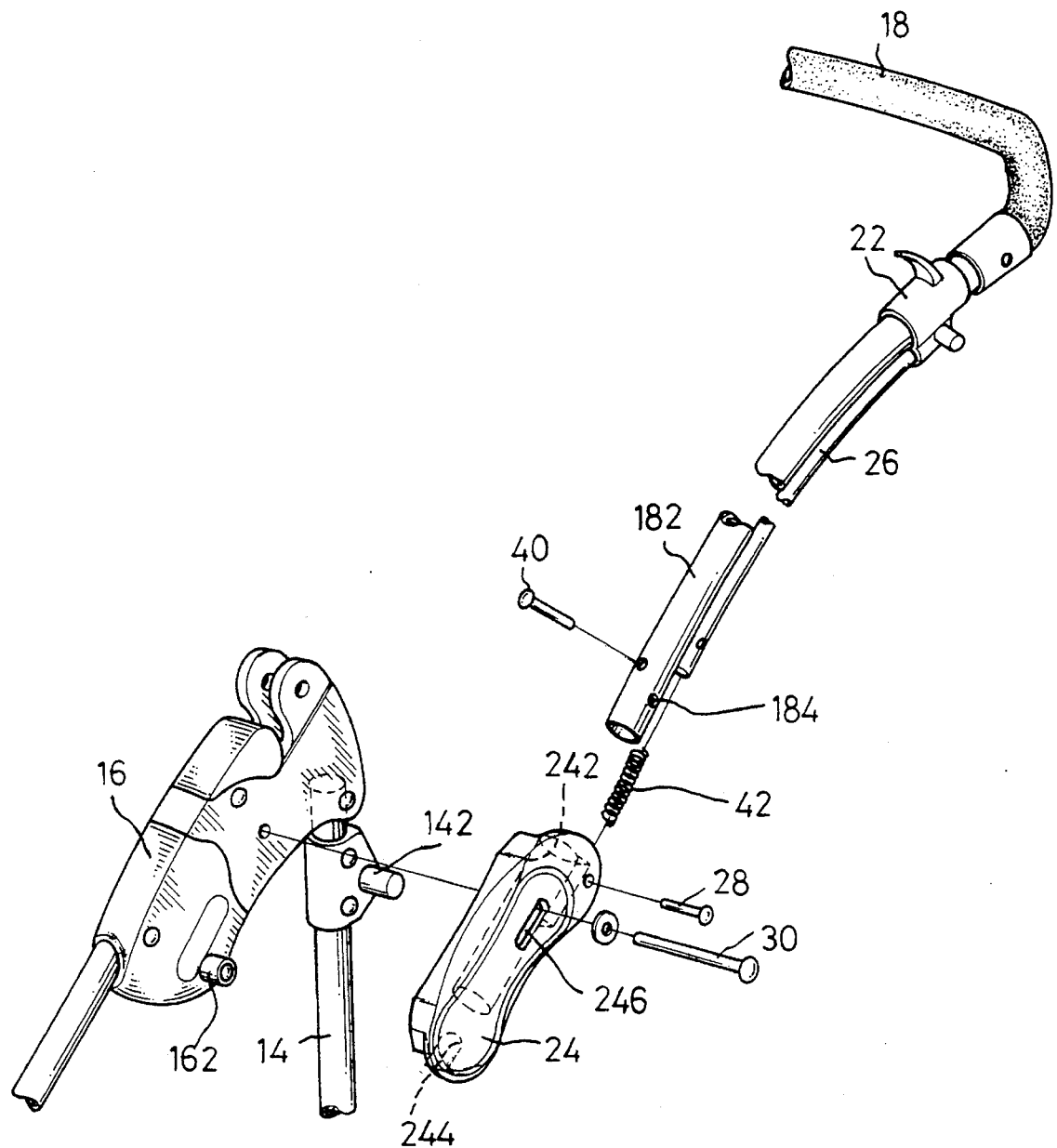
FIG. 3 is cut-away exploded view of FIG. 2 showing particularly the construction of a latch assembly and a handle of the stroller.

Referring now to FIG. 3, the latch assembly, generally identified by reference numeral 20, is coupled to a respective arm 182 of the U-shaped handle 18. The latch assembly 20 comprises a slide 22, a latch 24 and a linkage 26 fixedly interconnected between the slide 22 and the latch 24. The fixed connection between the slide 22 and the linkage 26 can be by force fitting or simply be pinned together and the fixed connection between the latch 24 and the linkage 26 can also be achieved by a pin 28 passing through both. The latch 24 is provided with a hollow portion 242 for slidably engaging with a free end of the arm 182 of the handle 18. Both the slide 22 and the latch 24 are slidably mounted on the arm 182 so that the whole assembly can move along the arm by manipulating the slide 22.

The latch 24 has a notch 244 at a distal end. The notch 244 is provided on an inner side thereof so that it is not visible from outside. The notch 244 engages with a protrusion 162 on the folding device 16 when the handle 18 is in a rearward position (cf. FIG. 2) and engages with a protrusion 142 on the rear leg 14 when the handle 18 is in a forward position (cf. FIG. 6). The latch 24 further has an elongate hole 246. To permit a pivotal movement of the latch 24 (and therefore the handle 18 as will be further described later), a fastener 30 is provided passing through the elongate hole 246 and a hole 184 on the free end of the arm 182 and then fixing to the folding device 16. The fastener 30 therefore permits the latch assembly 20 and the handle 18 in together to pivot between a forward position and a rearward position with respect to the folding device 16.

Figure 4:
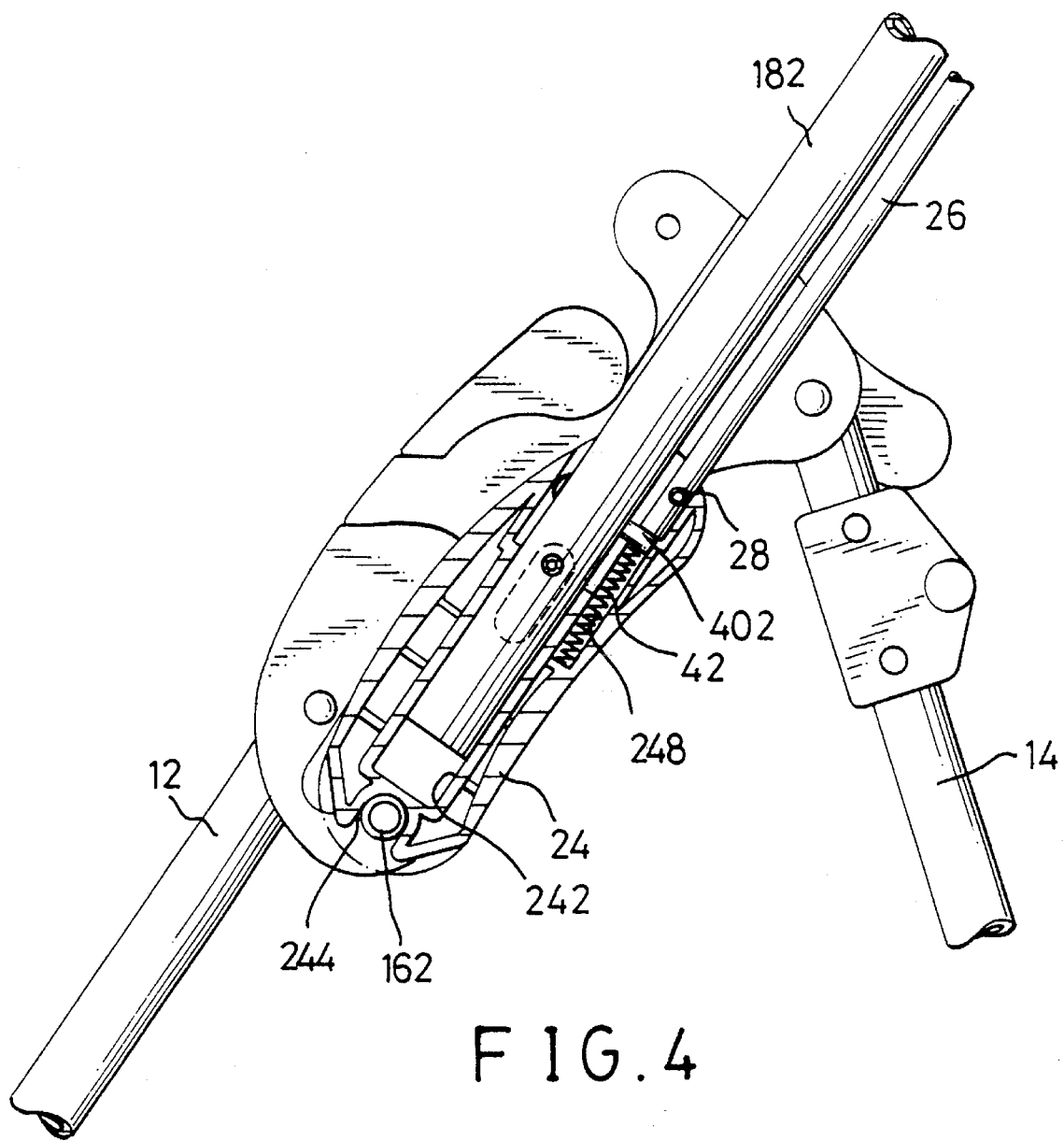
FIG. 4 is a cut-away, partially cross-sectional view of the assembled latch assembly in FIG. 3.
Figure 5:
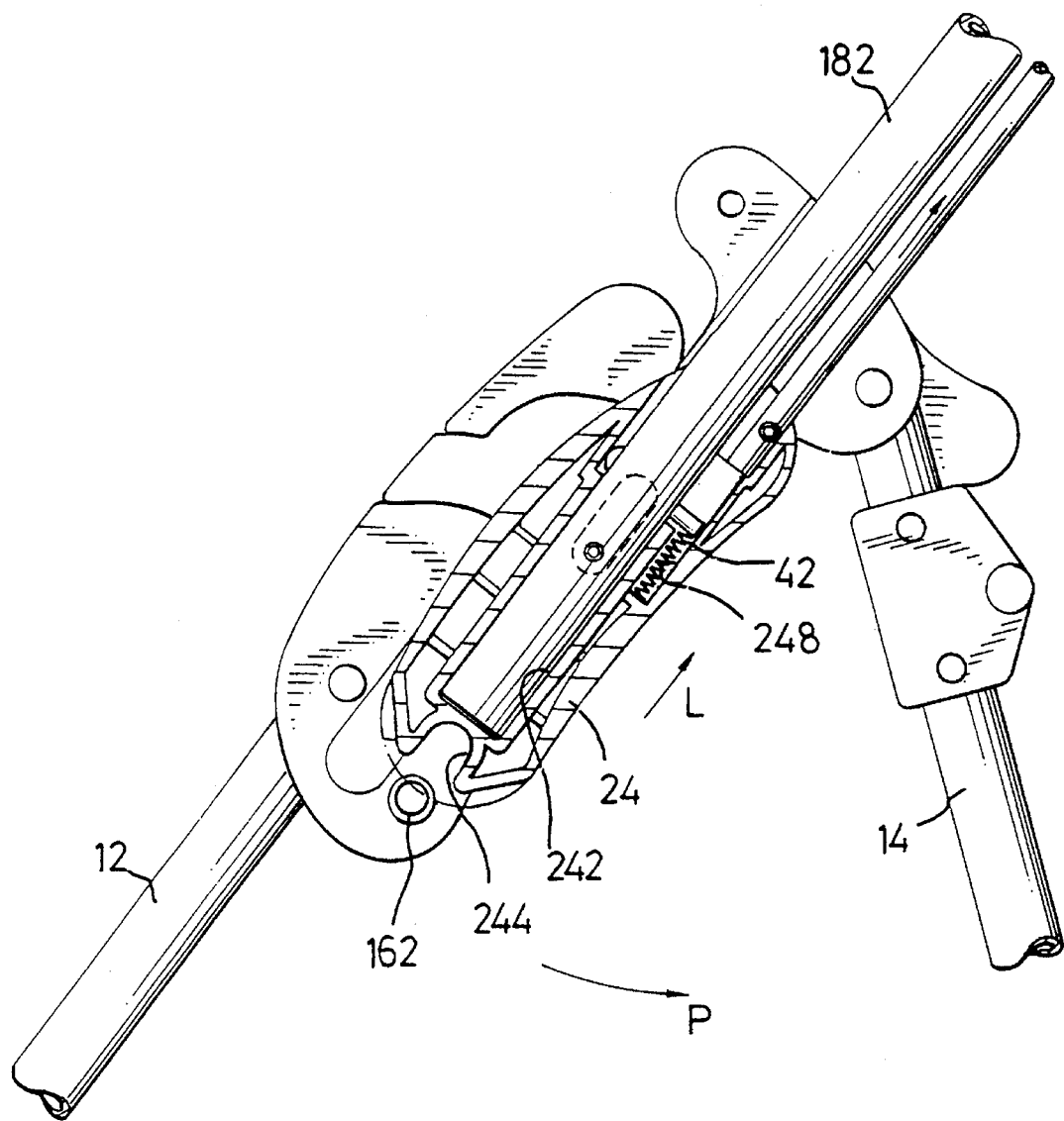
FIG. 5 is a view similar to FIG. 4 but with the latch assembly being lifted up to be in a disengaged state.
Figure 6:
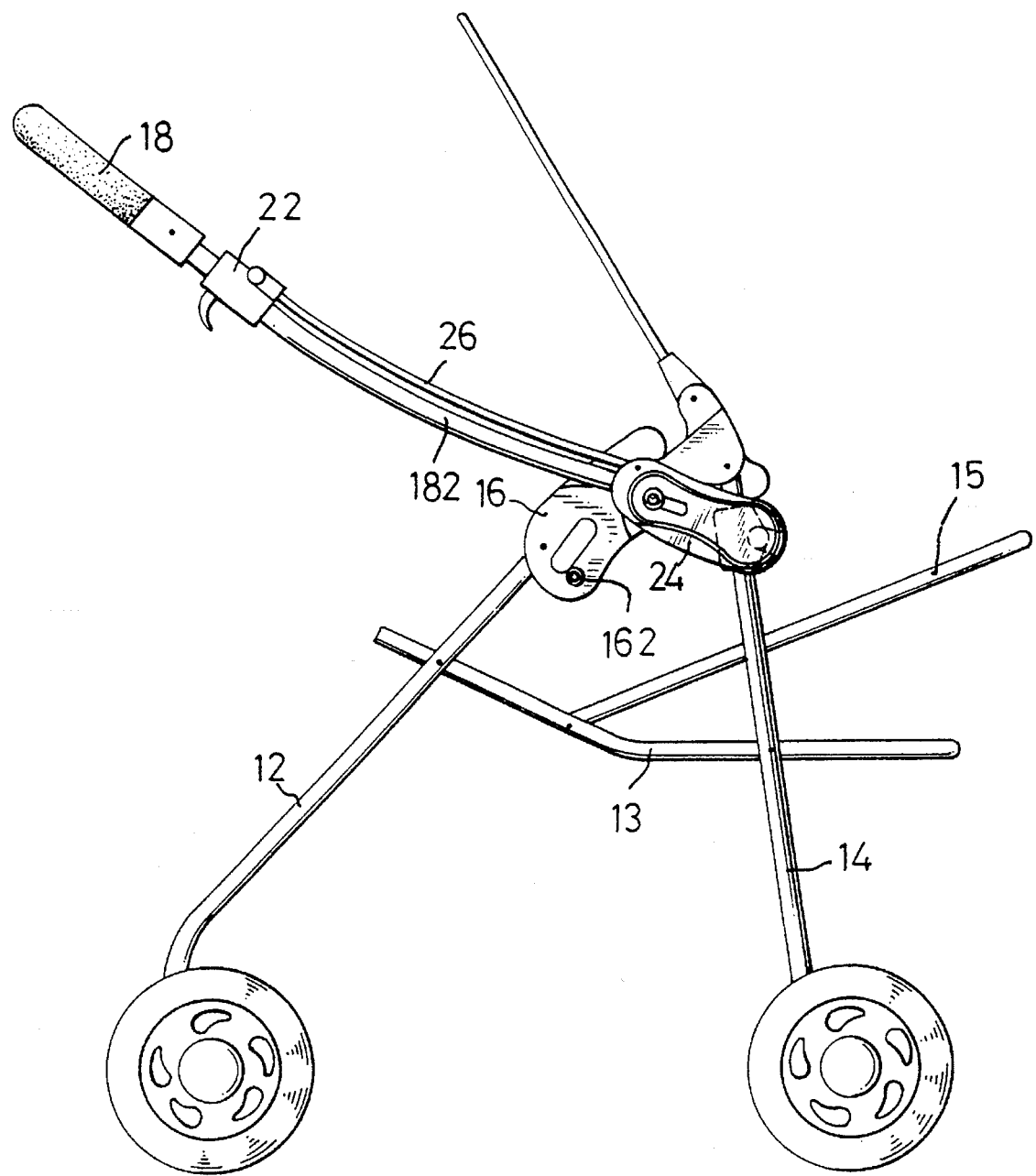
FIG. 6 is a view similar to FIG. 2 but with the handle being pivoted from a rearward position to a forward position.

Referring to FIG. 4, to releasably anchor or immobilize the latch assembly 20 with respect to the folding device 16, a pin 40 and a spring 42 are provided. The pin 40 passes through and is fixed on the arm 182 of the handle 18 with an end portion 402 protruding beyond the arm 182. The spring 42 is received within a blind hole 248 of the latch 24 and is compressed between the latch 24 and the protruding portion 402 of the pin 40 which is stationary with respect to the arm 182. Normally, the latch 24 is biased by the spring 42 against the pin 40 so that the latch 24 is immobilized on the folding device 16 via the engagement of the notch 244 and the protrusion 162. To release this engagement, the slide 22 is lifted up, in a direction as indicated by arrow L in FIG. 5, resisting a force from the spring that is further compressed between the latch 24 and the pin 42. At this time, the latch assembly 20 and the handle 18 can be pivoted, in a direction as indicated by arrow P, from a rearward position (FIG. 5) to a forward position (FIG. 6).

It is to be understood, however, that even though numerous characteristics and advantages of the present invention have been set forth in the foregoing description, together with details of the structure and function of the invention, the disclosure is illustrative only, and changes may be make in detail, especially in matters of shape, size, and arrangement of parts within the principles of the invention to the full extent indicated by the broad general meaning of the terms in which the appended claims are expressed.

I claim:

1. In a stroller having a pair of front legs, a pair of rear legs, a respective folding device interconnected between one of the front legs and a corresponding one of the rear legs, and a substantially U-shaped handle having a pair of arms, the improvement comprising:

a latch slidably coupled to a respective arm of the U-shaped handle, said latch having a notch at a distal end thereof and an elongate hole;

a first protrusion being provided on the folding device and a second protrusion being provided on a corresponding rear leg;

a fastener passing through said elongate hole and pivotally securing said handle arm to said folding device, thereby permitting the handle to pivot about the fastener between a rearward position in which the notch is releasably engageable with the first protrusion and a forward position in which the notch is releasably engageable with the second protrusion.

2. In a stroller having a pair of front legs, a pair of rear legs, a respective folding device interconnected between one of the front legs and a corresponding one of the rear legs, and a substantially U-shaped handle having a pair of arms, the improvement comprising:

a latch slidably coupled to a respective arm of the U-shaped handle, said latch comprising a notch at a distal end thereof for engagement with a first protrusion on the folding device when the handle is in a rearward position and with a second protrusion on the rear leg when the handle is in a forward position;

a fastener passing through an elongate hole in said latch and pivotally fixing the arm to the folding device; and means for releasably immobilizing the latch in the forward and the rearward positions with respect to the folding device.

3. The stroller as claimed in claim 2, wherein said means for releasably immobilizing the latch comprises a pin fixed on the arm of the handle and a spring interposed and compressed between said latch and said pin.

4. The stroller as claimed in claim 3, wherein said latch comprises a blind hole and said spring is received within said blind hole.

5. A stroller comprising:

a pair of front legs and a pair of rear legs, each rear leg having a second protrusion thereon, a substantially U-shaped handle having a pair of arms, a respective folding device coupling one of the front legs and a corresponding one of the rear legs, said folding device having a first protrusion thereon, a latch assembly slidably mounted on a respective arm of the handle, said latch assembly comprising a slide, a latch and a linkage fixedly interconnected between said slide and said latch, said latch comprising a hollow portion for receiving a free end of the arm of the handle, an elongate hole, a notch at a distal end thereof for engagement with said first protrusion when the handle is in a rearward position and with said second protrusion when the handle is in a forward position, a fastener passing through said elongate hole and pivotally fixing said free end of the arm to the folding device, and means for biasing said latch assembly to be releasably immobilized with respect to the folding device, said latch assembly being manipulatable to permit the handle and said assembly together to pivot between a forward position and a rearward position.

6. The stroller as claimed in claim 5, wherein said means for biasing comprises a pin fixed on the arm of the handle and a spring interposed and compressed between said latch and said pin.

7. The stroller as claimed in claim 6, wherein said latch comprises a blind hole and said spring is received within said blind hole.

* * * * *